United States Patent
Kramer

(10) Patent No.: US 11,066,255 B2
(45) Date of Patent: Jul. 20, 2021

(54) VACUUM CONVEYING SYSTEM FOR BULK MATERIAL, IN PARTICULAR PLASTIC GRANULES

(71) Applicant: Walter Kramer, Hünenberg See (CH)

(72) Inventor: Walter Kramer, Hünenberg See (CH)

( * ) Notice: Subject to any disclaimer, the term of this patent is extended or adjusted under 35 U.S.C. 154(b) by 0 days.

(21) Appl. No.: 16/789,452

(22) Filed: Feb. 13, 2020

(65) Prior Publication Data

US 2020/0270074 A1   Aug. 27, 2020

(30) Foreign Application Priority Data

Feb. 27, 2019   (DE) .................... 10 2019 001 471.5

(51) Int. Cl.
| | |
|---|---|
| *B65G 53/24* | (2006.01) |
| *B65G 53/52* | (2006.01) |
| *B65G 53/40* | (2006.01) |
| *B65G 53/66* | (2006.01) |

(52) U.S. Cl.
CPC ............ *B65G 53/24* (2013.01); *B65G 53/40* (2013.01); *B65G 53/52* (2013.01); *B65G 53/66* (2013.01); *B65G 2201/042* (2013.01); *B65G 2812/1625* (2013.01); *B65G 2812/1641* (2013.01)

(58) Field of Classification Search
CPC ........ B65G 53/24; B65G 53/26; B65G 53/40; B65G 53/52; B65G 53/56; B65G 53/66; B65G 2812/1616; D01G 23/05; B01F 15/0223; B01F 15/0238
USPC ... 406/1, 123, 127, 145, 151, 152, 153, 156, 406/198; 137/255
See application file for complete search history.

(56) References Cited

U.S. PATENT DOCUMENTS

| | | | | |
|---|---|---|---|---|
| 2,154,945 A | * | 4/1939 | Kyes ........................ | F23K 3/00 137/887 |
| 2,572,862 A | * | 10/1951 | Israel ..................... | B65G 53/06 406/2 |
| 2,730,407 A | * | 1/1956 | Berg ....................... | B01J 8/1863 406/156 |
| 2,752,944 A | * | 7/1956 | Temple ................... | A21C 11/16 137/554 |
| 2,895,768 A | * | 7/1959 | Bray, Jr. ................. | A21C 1/143 406/109 |

(Continued)

FOREIGN PATENT DOCUMENTS

| | | |
|---|---|---|
| DE | 25 31 033 | 1/1977 |
| DE | 36 37 701 | 5/1988 |
| DE | 39 00 173 | 7/1990 |

*Primary Examiner* — Joseph A Dillon, Jr.
(74) *Attorney, Agent, or Firm* — Gudrun E. Huckett

(57) ABSTRACT

A vacuum conveying system has at least two storage locations and at least two consumers connected by supply conduits and discharge conduits to each other. A vacuum source is provided that produces a vacuum flow/air flow. A central material conduit is provided with valves, wherein the supply conduits and the discharge conduits each have one of the valves associated therewith. The valves actuate conveying paths of bulk material from the at least two storage locations to the at least two consumers. The valves have a first position and a second position, wherein in the first position the valves open the material conduit to provide a through passage. In the second position, the valves supply the vacuum flow/air flow to the central material conduit or conduct the vacuum flow/air flow away from the central material conduit.

11 Claims, 3 Drawing Sheets

(56) References Cited

U.S. PATENT DOCUMENTS

| | | | |
|---|---|---|---|
| 3,077,365 A * | 2/1963 | Fisher | A21C 1/143 406/23 |
| 3,194,607 A * | 7/1965 | Timmons | B65G 53/06 406/156 |
| 3,224,812 A * | 12/1965 | Bozich | A01K 5/02 406/1 |
| 3,797,890 A * | 3/1974 | Walters | B65G 53/06 406/33 |
| 3,854,778 A * | 12/1974 | Trythall | B65G 53/12 406/3 |
| 4,082,364 A * | 4/1978 | Krambrock | B65G 53/60 406/33 |
| 4,091,840 A * | 5/1978 | Grove | F16K 11/07 137/269 |
| 4,599,017 A * | 7/1986 | Russemeyer | B65G 53/525 406/156 |
| 4,715,748 A * | 12/1987 | Krambrock | B65G 53/525 406/11 |
| 4,793,711 A * | 12/1988 | Ohlson | B01F 15/0445 366/18 |
| 4,850,703 A * | 7/1989 | Hanaoka | B01F 15/00253 366/160.1 |
| 5,147,152 A * | 9/1992 | Link | B29B 7/78 406/1 |
| 5,294,154 A * | 3/1994 | Le Devehat | B65G 53/56 285/26 |
| 5,378,089 A * | 1/1995 | Law | B01J 4/00 406/123 |
| 5,622,457 A * | 4/1997 | Thiele | B65G 53/56 406/1 |
| 5,651,401 A * | 7/1997 | Cados | B65B 1/36 141/103 |
| 6,089,378 A * | 7/2000 | Mascheretti | D01G 31/003 209/134 |
| 6,386,800 B1 * | 5/2002 | van Eyck | B65G 53/525 406/14 |
| 6,749,373 B2 * | 6/2004 | Von Geldern | B65G 53/528 406/23 |
| 7,080,960 B2 * | 7/2006 | Burnett | B65G 43/08 406/11 |
| 7,114,889 B2 * | 10/2006 | Kanou | B65G 53/66 406/14 |
| 7,318,459 B2 * | 1/2008 | Frankeberger | B65G 51/02 141/67 |
| 7,775,236 B2 * | 8/2010 | Gold | H01J 37/32449 137/487.5 |
| 8,727,671 B2 * | 5/2014 | Sundholm | E04F 17/10 406/145 |
| 9,242,808 B2 * | 1/2016 | Sundholm | B65G 53/24 |
| 9,433,908 B2 * | 9/2016 | Stevenson | B65G 53/66 |
| 9,561,915 B2 * | 2/2017 | Kelly | B65G 53/24 |
| 10,131,506 B2 * | 11/2018 | Maguire | B65G 23/44 |
| 10,293,317 B2 * | 5/2019 | Margalit | B29C 48/92 |
| 10,626,524 B2 * | 4/2020 | Cory | D01G 13/00 |
| 10,906,757 B2 * | 2/2021 | Kramer | B65G 53/04 |
| 2005/0039816 A1 | 2/2005 | Maguire | |
| 2005/0212287 A1 * | 9/2005 | Caro | F16L 41/023 285/125.1 |
| 2013/0100760 A1 * | 4/2013 | Kemp | B01F 15/0429 366/141 |
| 2014/0348597 A1 | 11/2014 | Moretto | |
| 2016/0176657 A1 * | 6/2016 | Kramer | B65G 53/04 406/183 |
| 2018/0049366 A1 * | 2/2018 | Frasier | A01C 15/00 |
| 2018/0201453 A1 * | 7/2018 | Maguire | B65G 53/66 |
| 2019/0054660 A1 * | 2/2019 | Maguire | B29B 13/065 |
| 2019/0100391 A1 * | 4/2019 | Managan, II | B65G 67/24 |
| 2020/0108163 A1 * | 4/2020 | Kleinmann | A61L 2/208 |

\* cited by examiner

VACUUM CONVEYING SYSTEM FOR BULK MATERIAL, IN PARTICULAR PLASTIC GRANULES

BACKGROUND OF THE INVENTION

The invention concerns a vacuum conveying system for bulk material, in particular plastic granules, comprising at least two storage locations and comprising at least two consumers that are connected to each other by supply conduits and discharge conduits, wherein, for actuating the conveying paths of the bulk material from the storage locations to the consumers, valves are provided, and further comprising at least one vacuum source.

In conveying facilities for bulk material, storage locations that contain the bulk material and are silos, for example, are connected by supply conduits and discharge conduits to consumers. In order to connect a desired storage location to a desired consumer, a so-called coupling station is provided in the flow path between the storage locations and the consumers with which the flow path of the bulk material from the respective storage location to the respective consumer can be actuated. Such coupling stations can be embodied, for example, in the form of a coupling matrix that comprises a plurality of conduits and valves which must be actuated depending on the desired conveying path of the bulk material from the storage location to the consumer. Such coupling stations are however expensive and require a significant mounting expenditure.

The invention concerns the object of configuring the vacuum conveying system of the aforementioned kind in such a way that in a constructively simple way a flow connection between a selected storage location and a selected consumer can be produced.

SUMMARY OF THE INVENTION

This object is solved for the vacuum conveying system of the aforementioned kind in that, in a central material conduit, for each supply conduit and for each discharge conduit one valve is provided, respectively, wherein the valve opens in a first position the material conduit to provide a through passage and, in a second position, supplies the vacuum flow/air flow to the material conduit or conducts it away from the material conduit.

Instead of a coupling station, the vacuum conveying system according to the invention comprises a central material conduit into which the material from the storage location can be supplied in the region of the storage locations with the valves. In the region of the consumers, the material conduit is provided with additional valves through which the material can be supplied to the respective consumer when the valve is in a corresponding actuated position. The valves associated with the storage locations and the consumers can be actuated into two positions. In the first position, the material conduit is open providing a through passage, i.e., the storage locations and the consumers are decoupled with regard to flow communication from the material conduit. In the second position, the valves produce the flow connection between the selected storage location and the selected consumer. In this case, the vacuum/air flow generated by the vacuum source is supplied such that the material from the selected storage location is supplied to the material conduit and is discharged from the material conduit in the region of the selected consumer so that the material reaches the selected consumer by means of the vacuum/air flow. The vacuum conveying system is characterized by a very simple configuration. The coupling between the selected consumer and the selected storage location is realized by a single central material conduit. It can be arranged arbitrarily in the vacuum conveying system because the valves themselves are part of the material conduit. The material conduit has no connectors to which the valves must be connected.

Advantageously, the discharge conduits of the vacuum suction system are connected to separating containers which are associated with the consumers. The conveyed material first reaches the separating containers from where the material is transferred to the consumers at a predetermined point in time.

The separating containers are connected by vacuum valves to a vacuum line which is connected to the vacuum source. When conveying the material, the vacuum valve of the separating container to which this material is to be conveyed is open so that the material can be conveyed out of the selected storage location by means of the open vacuum valve.

In a particularly preferred embodiment, the valves comprise two valve elements. The first valve element opens the passage of the material conduit in the first position of this valve. This valve element forms a part of the material conduit. The other valve element produces the branch from the material conduit to the selected consumer or to the selected storage location.

The object of the invention is further solved in that, in a central material conduit, for each supply conduit and for each discharge conduit one valve is provided, respectively, in that the valves of the storage locations and of the consumers in a first position open the material conduit, in that the valves of the storage locations in a second position supply the vacuum flow/air flow to the material conduit, and in that the valves of the consumers in a second position discharge the air flow from the material conduit and simultaneously return it through a further connector.

This solution is characterized also in that the valves are positioned within the material conduit and are themselves part of the material conduit. When the valves of the storage locations as well as of the consumers are in the first position, then the material conduit is open across its entire length and forms a continuous conduit. When material is to be removed from one of the storage locations and to be supplied to one of the consumers, the corresponding valves of the respective storage location as well as of the respective consumer are moved into the second position. Then, the vacuum/air flow can remove the material from the respective storage location and supply it through the open valves to the selected consumer. The valves of the consumers are designed such that they not only discharge the air flow from the material conduit but at the same time supply this air flow through a further connector back to the material conduit. The part of the material conduit which is positioned in conveying direction of the material downstream of the actuated valve serves then as a vacuum conduit which is connected to the vacuum source. In this way, separate vacuum valves on separating containers as well as a separate vacuum conduit are not required. This contributes to a particularly inexpensive and constructively simple configuration of the vacuum conveying system.

Advantageously, the material conduit is extended to the vacuum source so that the sections of the material conduit which are located downstream of the actuated valve in conveying direction of the material can serve as a vacuum conduit.

Advantageously, the valves associated with the consumers are connected through the discharge conduits and air return conduits to the consumer. By means of the discharge conduits, the material conveyed from the storage location reaches the selected consumer.

The vacuum conveying system according to the invention is further characterized in that the first valve elements of the valves themselves form the material conduit or at least part thereof.

The subject matter of the application results not only from the subject matter of the individual claims but also from all specifications and features disclosed in the drawings and the description. The disclosed specifications and features are, even if they are not subject matter of the claims, claimed as important to the invention as far as, individually or in combination, they are novel relative to the prior art.

Further features of the invention result from the additional claims, the description, and the drawings.

BRIEF DESCRIPTION OF THE DRAWINGS

The invention will be explained in more detail with the aid of three embodiments illustrated in the drawings.

DESCRIPTION OF PREFERRED EMBODIMENTS

Figure 1:
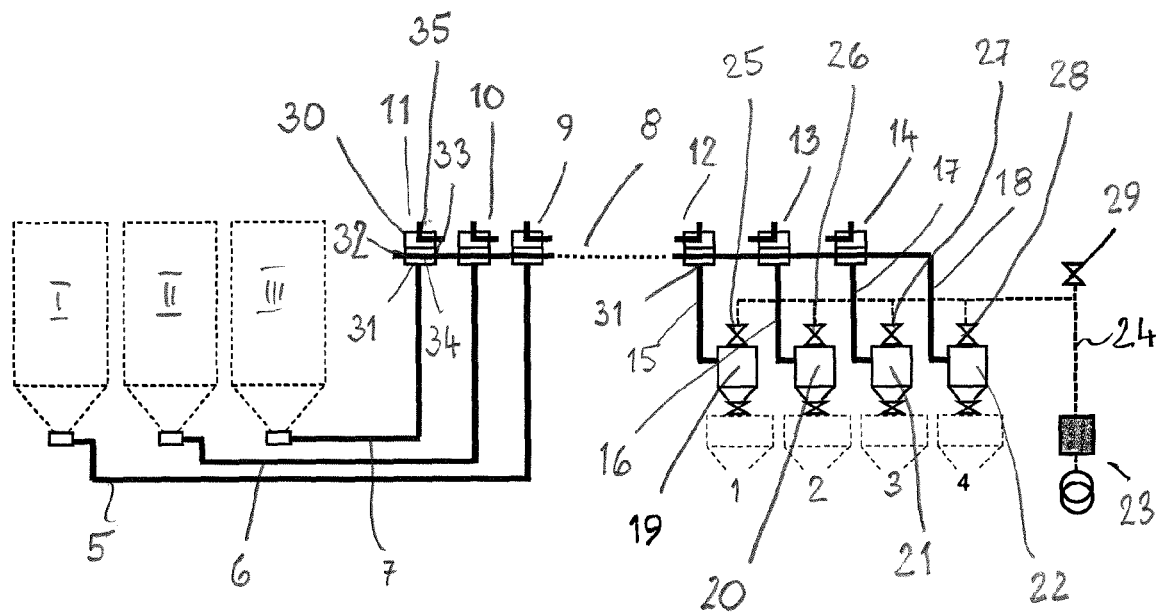
FIG. 1 shows in schematic illustration a vacuum conveying system according to the invention in an initial position in which the vacuum conveying process is not occurring.

FIG. 1 shows schematically a pneumatic vacuum conveying system with which bulk material is conveyed from at least one storage location I to III to at least one consumer 1 to 4. In FIG. 1, three storage locations I to III and four consumers 1 to 4 are illustrated in an exemplary fashion. However, the number of storage locations and consumers is to be understood only as exemplary.

The bulk material to be transported is stored in the storage locations I to III. As consumers 1 through 4, processing machines, mixing and drying devices and the like are conceivable, for example.

Bulk material is to be understood as any material that can be conveyed by means of a vacuum/air flow, for example, flowable powder, granules and the like.

Each storage location I to III is connected by supply lines 5 to 7 to a central material conduit 8.

The connection of the supply lines 5 to 7 to the material conduit 8 is realized by a respective valve 9 to 11.

Further valves 12 to 14 are seated in the material conduit 8 and are connected by discharge lines 15 to 18 to separating containers 19 to 22 which are seated on the consumers 1 to 4.

For generating the vacuum, a vacuum source 23 is provided which in a known manner is connected by a vacuum conduit 24 to the separating containers 19 to 22. The latter are connected by means of a respective vacuum valve 25 to 28 to the vacuum conduit 24.

A leak air valve 29 can be provided in the vacuum conduit 24 in the region between the vacuum source 23 and the separating containers 19 to 22. In this way, the valves 9 to 11, 12 to 14 can be actuated without material flow/air flow.

The valves 9 to 11 and 12 to 14 are of identical configuration. In the following, the configuration of the valve 11 will be described.

The valve 11 has the valve housing 30 which comprises an inlet 31 to which the supply conduit 7 is connected. In addition, the valve housing 30 is provided with a further inlet 32 and an outlet 33.

In the valve 11, there are two valve elements 34, 35 which are sealed relative to each other. The valve element 34 is configured as a pipe which connects the oppositely positioned inlet 32 and outlet 33 to each other and simultaneously closes off the inlet 31 in the position illustrated in FIG. 1.

The valve element 35 is configured as an elbow pipe which assumes an inoperative position in the position illustrated in FIG. 1. For the conveying process, the valve element 35 is moved into the through passage position in which it connects in flow communication the inlet 31 to the outlet 33.

Figure 2:
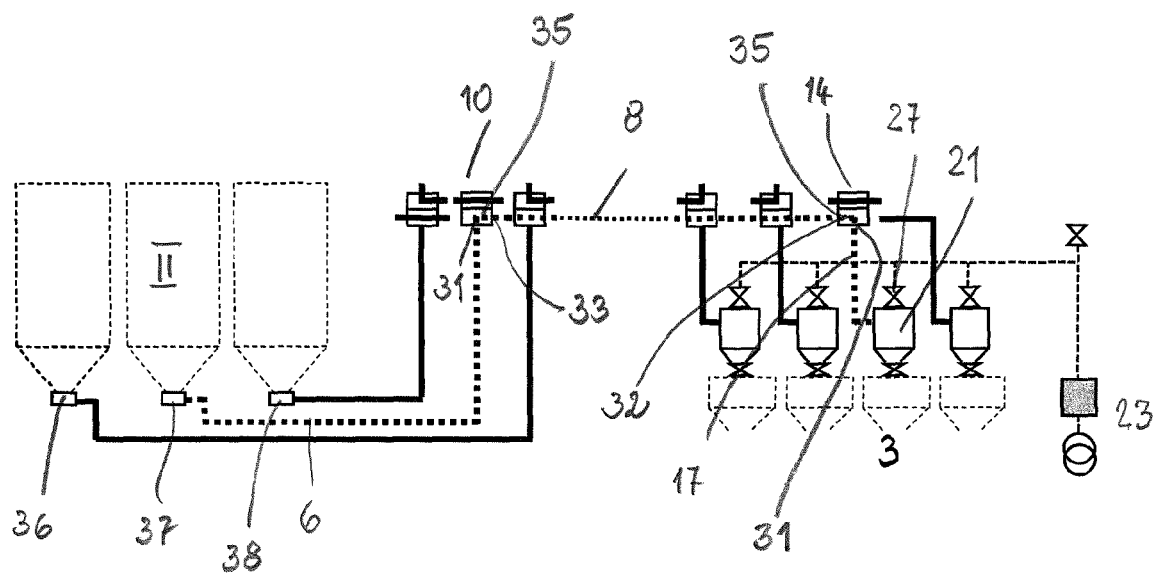
FIG. 2 shows the vacuum conveying system according to FIG. 1 during the vacuum conveying process.

The two valve elements 34, 35 can be moved in the valve housing 30 into two different positions, as can be seen by comparing FIGS. 1 and 2.

When no suction process is taking place, the valves 9 to 11 and 12 to 14 are actuated such that the valve elements 34 connect in flow communication the oppositely positioned inlet 32 and outlet 33. The vacuum valves 25 to 28 of the separating containers 19 to 22 are closed. All valves 9 to 14 are switched to transit.

The valve elements 34 form a part of the material conduit 8 which in the transit position of all valves 9 to 14 (FIG. 1) extends through these valves. In contrast to the known conveying systems, there is no material conduit provided to which the valves are connected. The valves are instead part of the material conduit 8 itself in that the valve elements 34 are part of the continuous material conduit 8.

When a conveying process is to take place, the valves 9 to 11 and 12 to 14 are actuated such that the desired storage location I to III is connected to the desired consumer 1 to 4. FIG. 2 shows in an exemplary fashion the situation that the storage location II is connected to the consumer 3. As soon as the vacuum valve 27 of the separating container 21 of the consumer 3 opens, the conveying process can be started by means of the vacuum source 23.

For conveying the material out of the storage location II, the valve 14 is switched. Now the valve element 35 connects the two inlets 31, 32 to each other so that the material flows from the material conduit 8 into the separating container 21.

The valve 10 is also switched so that the valve element 35 connects the inlet 31 to the outlet 33.

The material is thus conveyed from the storage location II via the supply conduit 6, the switched valve 10, the material conduit 8, the switched valve 14, and the discharge conduit 17 into the separating container 21. Since the other valves 9, 11, 12, 13, 25, 26, and 28 have not been switched, the material can be supplied from the storage location II in a targeted fashion to the separating container 21 and thus to the consumer 3.

The storage locations I to III are provided at their outlet with a respective suction device 36 to 38 which is actuated only when the material is to be removed from the respective storage location I to III. In the illustrated embodiment, the suction device 37 is accordingly active so that the material can be sucked out of the storage location II. The suction devices 36 to 38 can be suction boxes under the storage locations I to III or suction pipes in case of open containers.

After completion of a predetermined suction time or suction quantity, the valve 10 is switched. It assumes thus the transit position as it is illustrated in FIG. 1. The central material conduit 8 and the discharge conduit 17 are then emptied by suction.

As soon as this suction time for emptying has expired, the valve 14 is also switched into the transit position and the vacuum valve 27 on the separating container 21 is closed. The suction conveying process is thereby terminated. All valves 9 to 14 in the central material conduit 8 are switched to transit and the utilized conveying conduits between the valves are cleaned to be dust-free.

When one of the storage locations I to III is to be connected to the consumer 4, the valves 12 to 14 remain in the transit position illustrated in FIG. 1. Only the respective valve 9 to 11 of the storage locations I to III must be switched so that the material is conveyed from the corresponding storage location I to III to the consumer 4 when the vacuum valve 28 is opened.

In the described way, the storage locations I to III can be connected as needed with any of the consumers 1 to 4. Only the corresponding valves 9 to 11 and 12 to 14 must be actuated such that the corresponding storage location I to III is connected to the corresponding consumer 1 to 4. The suction process is realized in the same way as has been explained beforehand with the aid of the embodiment according to FIG. 2.

Only a single central material conduit 8 is provided for supplying the material from the respective storage location I to III to the respective consumer 1 to 4. It replaces the coupling stations which are used in conventional vacuum conveying systems and which require a plurality of conduits and valves in a matrix form in order to connect the storage locations to the respective consumer.

In the described vacuum conveying system, the single material conduit 8 simplifies the construction significantly. The material conduit is only comprised of the valves 9 to 11 by means of which the access to the storage locations I to III can be produced and of the valves 12 to 14 by means of which the access to the separating containers 19 to 22 and thus to the consumers 1 to 4 can be produced.

The configuration of the described valves 9 to 14 with the two valve elements 34, 35 is known (U.S. patent application Ser. No. 16/461,394, published as US publication No. 2020/055679 on Feb. 20, 2020, now U.S. Pat. No. 10,906,757 issued on Feb. 2, 2021). With regard to the configuration of the valves, reference is being had expressly to this application the entire disclosure of which, inasmuch as the configuration of the valves is concerned, is incorporated by reference herein.

The valves 9 to 14 can be placed immediately next to each other wherein their valve elements 34 in the transit position (FIG. 1) adjoin each other seal-tightly and form the continuous material conduit 8.

The valves 9 to 11, respectively, 12 to 14 can also be positioned at a spacing to each other. Then conduit pieces are provided between the valves and are joined seal-tightly to the inlet 32 and outlet 33 of the valves. In this case, the conduit pieces, which can be designed to be relatively short, and the valve elements 34 form the continuous material conduit 8 in the transit position of the valves.

In an exemplary fashion, the vacuum conveying system according to FIGS. 3 and 4 has again the three storage locations I to III which are provided with the suction devices 36 to 38 to which the supply conduits 5, 6, 7 are connected. The supply conduits 5 to 7 are connected to the common material conduit 8 through the valves 9 to 11. The valves 9 to 11 are of the same configuration as in the preceding embodiment.

The valves 12' to 14', 39 by means of which the consumers 1 to 4 can be connected to the material conduit 8 are seated in the material conduit 8.

The valves 12' to 14', 39 are of identical configuration. These valves have the inlet 32 and outlet 33 which can be connected to each other by the valve element 34 in the transit position of the valve.

Moreover, these valves have the valve elements 35 and 35' which are each designed as an elbow pipe and can connect the material conduit 8 in a corresponding valve position to the discharge conduits 15 to 18 and also to the air return conduits 40 to 43.

The valves 12' to 14', 39 have also a second inlet 31' in addition to the inlet 31. The discharge conduits 15 to 18 are connected to the inlet 31 and the air return conduits 40 to 43 are connected to the inlet 31'.

Figure 3:
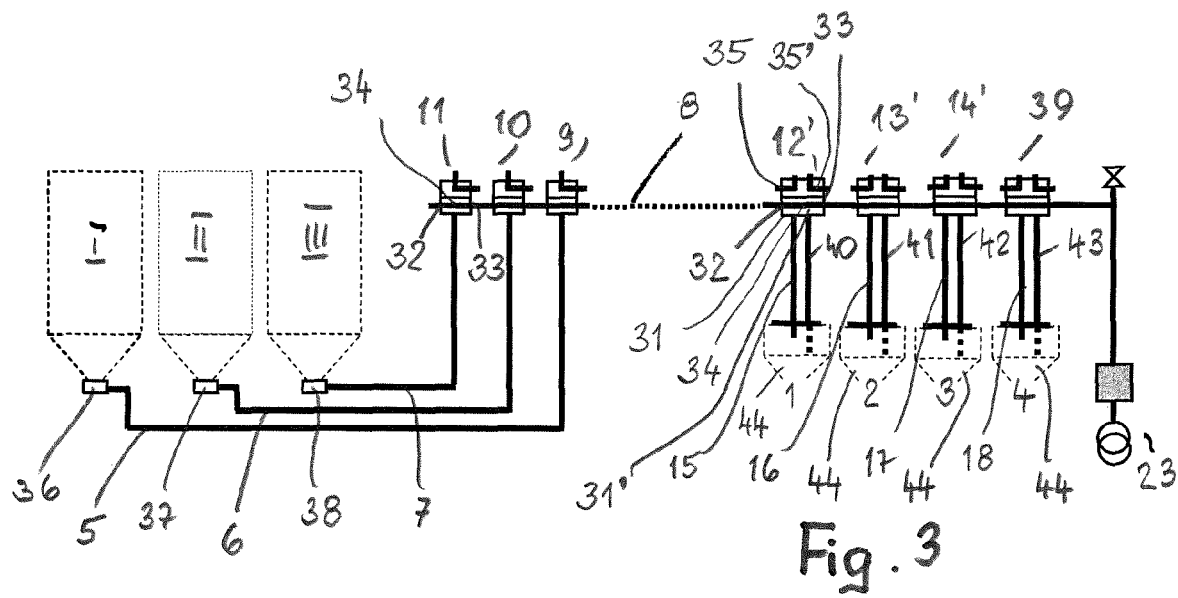
FIG. 3 shows in an illustration corresponding to FIG. 1 a second embodiment of a vacuum conveying system according to the invention.

As long as no conveying action takes place, the valves 9 to 11, 12' to 14', 39 are switched to transit (FIG. 3). In this valve position, the valve elements 34 embodied as straight pipe pieces connect the inlet 32 and outlet 33 of the respective valves to each other and form the continuous material conduit 8 (FIG. 3) in the way described with the aid of the preceding embodiment.

The material conduit 8 continues downstream of the valve 39 directly to the vacuum source 23. In this way, the vacuum conduit 24 and the vacuum valves 25 to 28 on the separating containers 19 to 22 are thus not required in contrast to the preceding embodiment. In most processing machines such as injection molding machines or extruders, the machine hopper 44 itself can be used as a separating container for the material to be processed.

Figure 4:
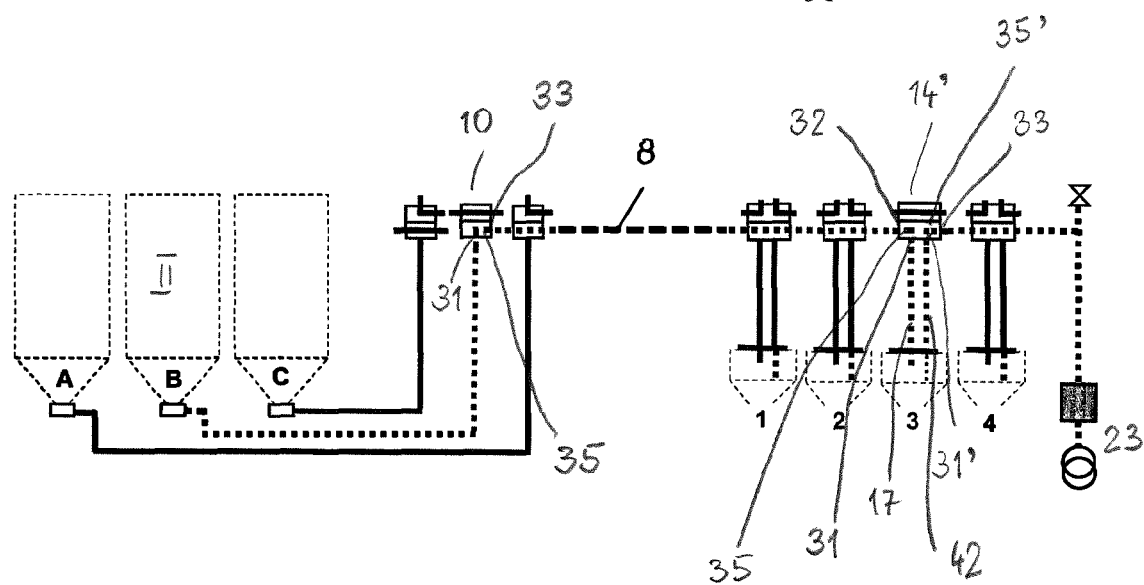
FIG. 4 shows the vacuum conveying system according to FIG. 3 during the vacuum conveying process.

As in the preceding embodiment, each one of the storage locations I to III can be connected to each one of the consumers 1 to 4. In FIG. 4, it is illustrated in an exemplary fashion how the storage location II can be connected to the consumer 3. The valve 10 is switched so that the valve element 35, which is embodied as an elbow pipe in accordance with the preceding embodiment, connects the inlet 31 to the outlet 33 of the valve 10.

The valve 14' correlated with the consumer 3 is also switched so that the valve element 35 embodied as an elbow pipe connects the inlet 32 to the inlet 31 and the other valve element 35' embodied as an elbow pipe connects the inlet 31' to the outlet 33.

By switching the valve 14', the material conduit 8 is connected in flow communication with the discharge conduit 17 so that the material coming from the storage location II can be supplied to the consumer 3. Also, the vacuum source 23 is connected in flow communication with the air return conduit 42 by means of the switched valve 14'.

The vacuum source 23 now sucks the material via the consumer 3 and the material conduit 8 out of the storage location II. After completion of a predetermined suction time or suction quantity, the valve 10 is switched again into the transit position (FIG. 3). This has the result that the material conduit 8 including the discharge conduit 17 will be emptied by suction. As soon the suction time for emptying has expired, the valve 14' is also switched to the transit position so that all valves 9 to 11, 12' to 14', 39 and the tubular conduits optionally present between the valves are cleaned to be dust-free.

In the embodiment according to FIGS. 3 and 4, the desired storage locations I to III can be selectively connected in flow communication to the desired consumers 1 to 4 in the described way.

The valves 12' to 14', 39 not only actuate the discharge conduits 15 to 18 but at the same time also the air return conduits 40 to 43. In this way, a separate vacuum conduit that is provided in addition to the central material conduit 8 is not required.

In other respects, the embodiment according to FIGS. 3 and 4 corresponds to the embodiment according to FIGS. 1 and 2.

The valves 12' to 14', 39 are designed such that, upon switching from the transit position into the branch position, both valve elements 35, 35' are adjusted simultaneously. The valves can be designed as slide valves so that by a sliding action the valve element 34 or the valve elements 35, 35' are selectively moved into their respective position. The valves 12' to 14', 39 can also be designed as rotary valves so that the valve elements 34 or 35, 35' reach their respective position by rotation.

Figure 5:
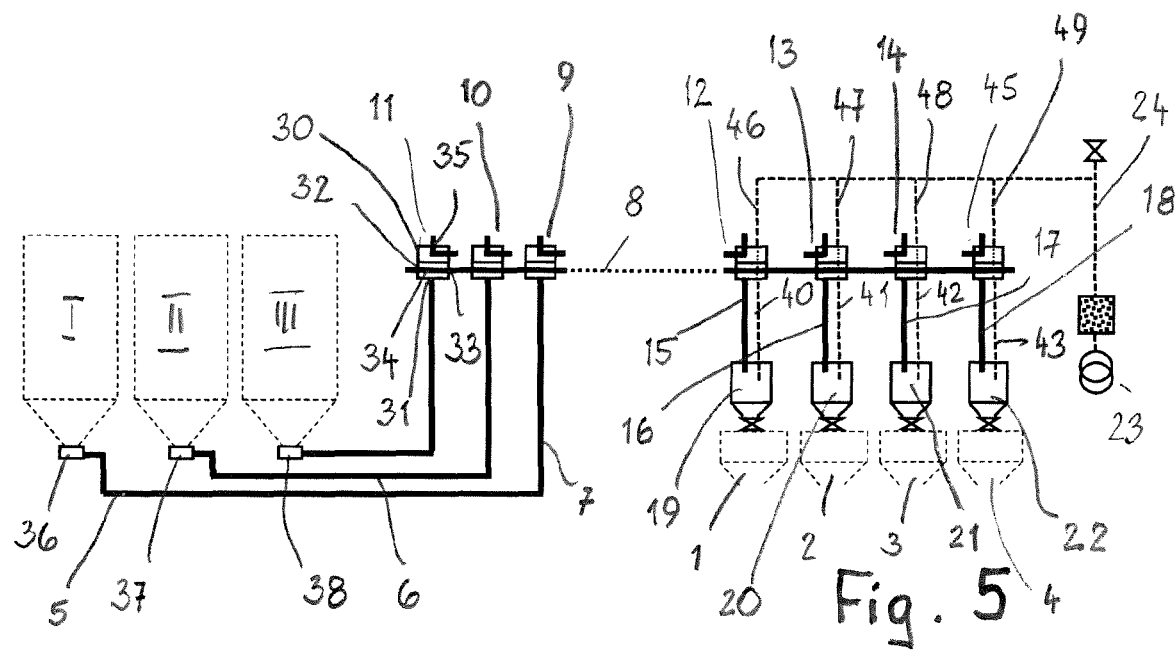
FIG. 5 shows in an illustration corresponding to FIG. 1 a third embodiment of a vacuum conveying system according to the invention.
Figure 6:
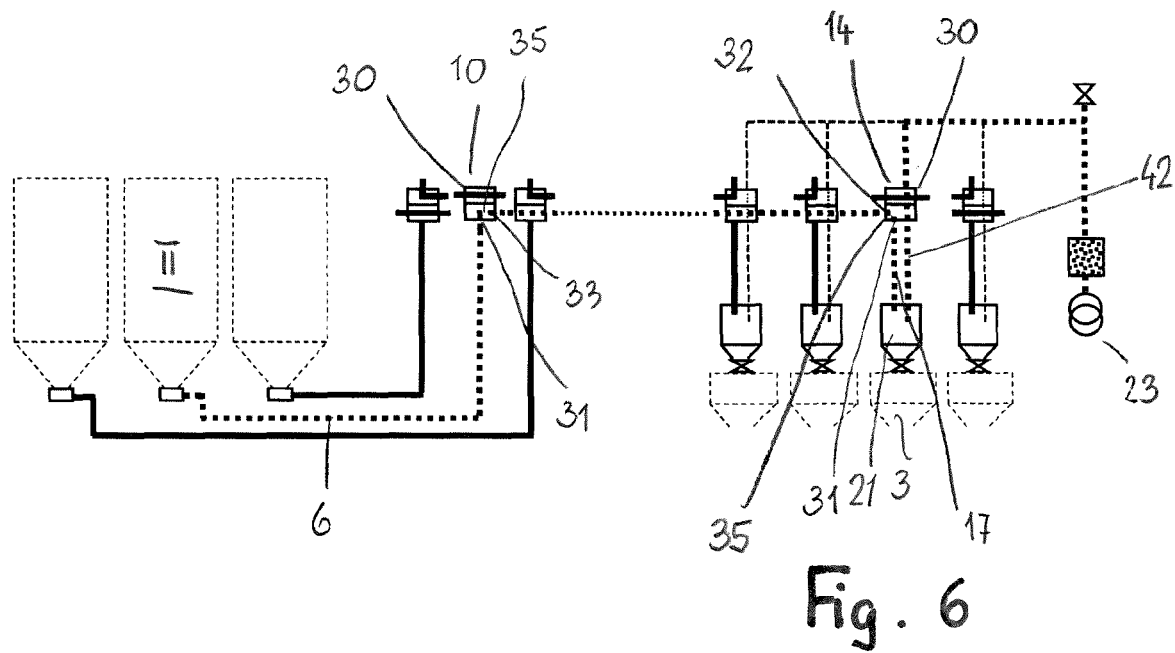
FIG. 6 shows the vacuum conveying system according to FIG. 5 during the vacuum conveying process.

In the embodiment according to FIGS. 5 and 6, the storage locations I to III are connected by the suction devices 36 to 38 and the supply conduits 5, 6, 7 to the valves 9 to 11 which are of the same configuration as in the preceding embodiments. The separating containers 19 to 22 which are seated on the consumers 1 to 4 are connected by the discharge lines 15 to 18 to the valves 12 to 14, 45 which are embodied in the same way as the valves 9 to 11. In accordance with the embodiment of FIGS. 1 and 2, the valves 9 to 11, 12 to 14, 45 have the two valve elements 34, 35. The valve element 34 is embodied in the described way as a straight pipe piece which connects the oppositely positioned inlet 32 and outlet 33 of the valve housing 30 with each other in the through passage position or transit position. The other valve element 35 is designed in the described way as an elbow pipe which connects in the operating position the inlet 31 to the outlet 33 of the valve housing 30.

Branch lines 46 to 49 extend away from the vacuum conduit 24 and connect the vacuum source 23 to the valves 12 to 14, 45. To the latter, the air return lines 40 to 43 are connected in accordance with the embodiment according to FIGS. 3 and 4.

As in the preceding embodiments, the valve elements 34 of the valves 9 to 14, 45 form the material conduit 8 which extends through all valves in the transit position illustrated in FIG. 5. In this embodiment, there is also no material conduit provided to which valves are connected. Instead, the valves themselves are part of the material conduit 8 in that their valve elements 34 are part of the continuous material conduit 8 and, inasmuch as the valves are immediately seated against each other, form the material conduit 8. The elbow pipe-shaped valve elements 35 are in their inoperative position. The straight tubular valve elements 34 connect the inlet 32 and outlet 33 of all valves 11 to 14, 45 seal-tightly to each other.

In this switching position of the valves, the air return lines 40 to 43 are closed.

In accordance with the preceding embodiments, any storage location I to III can be connected in flow communication to any consumer 1 to 4. It is therefore possible to supply any material stored in the storage locations I to III to any of the consumers 1 to 4.

In FIG. 6, it is shown in an exemplary fashion how material from the storage location II is supplied to the consumer 3. The valve 10 is switched so that the elbow pipe-shaped valve element 35 connects the inlet 31, to which the supply conduit 6 is connected, to the outlet 33 of the valve housing 30 in the described way.

Also, the valve 14 is switched so that the elbow pipe-shaped valve element 35 connects the inlet 32 to the inlet 31 of the valve housing 30. By means of the discharge conduit 17 connected to the inlet 31, the material reaches the separating container 21 of the consumer 3.

Simultaneous with the switching of the valve 14, the branch conduit 48 is connected to the air return conduit 42 so that by means of the vacuum source 23 the material can be sucked out of the storage location II.

All other valves 9, 11, 12, 13, and 45 are not switched.

The vacuum source 23 sucks the material out of the storage location II via the separator 21 and the material conduit 8. After completion of a predetermined suction time or suction quantity, the valve 10 is again switched to the transit position according to FIG. 5. In this way, the material conduit 8 including the discharge conduit 17 is emptied by suction. As soon as the suction time for emptying has expired, the valve 14 is also switched into the transit position so that now all valves 9 to 14, 45 and the tubular conduits possibly positioned between these valves are cleaned to be dust-free.

In this way, all storage locations I to III can be connected in flow communication to any of the consumers 1 to 4.

The valves 12 to 14, 45 not only constitute the flow connection between the storage locations I to III and the consumers 1 to 4 for material conveyance but are simultaneously also vacuum valves which connect the respective separator 19 to 22 to the vacuum source 23.

In other respects, this embodiment operates in the same manner as the preceding embodiments.

In deviation from the illustrated embodiment according to FIGS. 5 and 6, the discharge conduits 15 to 18 as well as the air return conduits 40 to 43 can be connected directly to the consumer 1 to 4, as has been explained with the aid of FIGS. 3 and 4.

The valves 9 to 11, 12 to 14 of the described embodiments can be designed as slide valves or rotary valves.

In all embodiments, a single material conduit 8 is provided between the storage locations I to III and the consumers 1 to 4 and is formed by the valves themselves or their valve elements 34 and optionally additionally by tubular conduits or conduit pieces. A constructively complex coupling station as it is provided in conventional vacuum conveying systems between the storage locations and the consumers is not required. The vacuum conveying systems can therefore be constructed in an inexpensive manner.

The specification incorporates by reference the entire disclosure of German priority document 10 2019 001 471.5 having a filing date of Feb. 27, 2019.

While specific embodiments of the invention have been shown and described in detail to illustrate the inventive principles, it will be understood that the invention may be embodied otherwise without departing from such principles.

What is claimed is:

1. A vacuum conveying system for bulk material, the vacuum conveying system comprising:
    at least two storage locations;
    at least two consumers;
    supply conduits and discharge conduits connecting the at least two storage locations and the at least two consumers to each other;
    at least one vacuum source configured to produce a vacuum flow/airflow;
    a central material conduit comprising a first end and an opposite second end and extending straight from the first end to the second end, wherein the central material conduit comprises valves arranged sequentially one after another along a length of the central material conduit from the first end to the opposite second end, wherein the supply conduits and the discharge conduits each have one of the valves associated therewith, and wherein the valves are configured to actuate conveying paths of the bulk material from the at least two storage locations to the at least two consumers;

wherein the valves have a first position and a second position, wherein in the first position the valves open the central material conduit to provide a straight through passage, and wherein in the second position the valves supply the vacuum flow/air flow to the central material conduit or conduct the vacuum flow/air flow away from the central material conduit.

2. The vacuum conveying system according to claim 1, wherein the discharge conduits are connected to separating containers associated with the at least two consumers.

3. The vacuum conveying system according to claim 2, further comprising a vacuum conduit connected to the at least one vacuum source, wherein the separating containers are connected by vacuum valves to the vacuum conduit.

4. The vacuum conveying system according to claim 1, wherein the valves each comprise a first valve element and a second valve element, wherein the first valve element opens the straight through passage of the central material conduit and the second valve element produces a branch from the central material conduit into one of the at least two consumers or into one of the at least two storage locations.

5. The vacuum conveying system according to claim 4, wherein the first valve elements form the central material conduit or at least a part thereof.

6. A vacuum conveying system for bulk material, the vacuum conveying system comprising:
at least two storage locations;
at least two consumers;
supply conduits and discharge conduits connecting the at least two storage locations and the at least two consumers to each other;
at least one vacuum source configured to produce a vacuum flow/airflow;
a central material conduit comprising valves, wherein the supply conduits and the discharge conduits each have one of the valves associated therewith, and wherein the valves are configured to actuate conveying paths of the bulk material from the at least two storage locations to the at least two consumers;

wherein the valves have a first position and a second position;

wherein in the first position the valves associated with the at least two storage locations and associated with the at least two consumers open the central material conduit;

wherein the valves associated with the at least two storage locations in the second position provide flow communication between the central material conduit and the at least two storage locations, respectively;

wherein the valves associated with the at least two consumers in the second position discharge the vacuum flow/air flow air from the central material conduit and simultaneously return the vacuum flow/air flow through a further connector into the central material conduit.

7. The vacuum conveying system according to claim 6, wherein the central material conduit is extended to the at least one vacuum source.

8. The vacuum conveying system according to claim 6, further comprising air return conduits connected to the at least two consumers, wherein the valves associated with the at least two consumers are connected through the discharge conduits and the air return conduits to the at least two consumers.

9. The vacuum conveying system according to claim 8, wherein the valves associated with the at least two consumers provide access to the discharge conduits and simultaneously provide a connection of the air return conduits to a vacuum conduit connected to the at least one vacuum source.

10. The vacuum conveying system according to claim 6, wherein the valves each comprise a first valve element and a second valve element, wherein the first valve element opens a through passage of the central material conduit and the second valve element produces a branch from the central material conduit into one of the at least two consumers or into one of the at least two storage locations, wherein the first valve elements form the central material conduit or at least a part thereof.

11. The vacuum conveying system according to claim 5, wherein the first valve elements are straight pipe sections and wherein the second valve elements are elbow pipes.

* * * * *